(12) United States Patent
Kubotera et al.

(10) Patent No.: US 6,540,945 B2
(45) Date of Patent: *Apr. 1, 2003

(54) CARBON-REINFORCED THERMOPLASTIC RESIN COMPOSITION AND ARTICLES MADE FROM SAME

(75) Inventors: Kazunao Kubotera, Delmar, NY (US); Nirajkumar Patel, Delmar, NY (US)

(73) Assignee: General Electric Company, Pittsfield, MA (US)

( * ) Notice: Subject to any disclaimer, the term of this patent is extended or adjusted under 35 U.S.C. 154(b) by 6 days.

This patent is subject to a terminal disclaimer.

(21) Appl. No.: 09/794,174

(22) Filed: Feb. 27, 2001

(65) Prior Publication Data

US 2001/0022356 A1 Sep. 20, 2001

Related U.S. Application Data

(63) Continuation of application No. 09/497,400, filed on Feb. 3, 2000, now Pat. No. 6,248,262.

(51) Int. Cl.⁷ .............................. H01B 1/24; C04B 35/52; B28B 1/24
(52) U.S. Cl. ....................... 252/511; 264/614; 264/641; 106/472
(58) Field of Search ..................... 252/511; 524/495; 106/472; 264/5, 614, 641

(56) References Cited

U.S. PATENT DOCUMENTS

| | | |
|---|---|---|
| 4,065,519 A | 12/1977 | Koch |
| 4,559,164 A | 12/1985 | Kostelnik et al. |
| 4,781,947 A | 11/1988 | Saito et al. |
| 5,004,561 A | 4/1991 | Nomura et al. |
| 5,068,061 A | 11/1991 | Knobel et al. |
| 5,216,046 A | 6/1993 | Kozmiski |
| 5,223,563 A | 6/1993 | Axelrod |
| 5,227,238 A | 7/1993 | Hirai et al. |
| 5,237,009 A | 8/1993 | Lee |
| 5,298,576 A | 3/1994 | Sumida et al. |
| 5,334,635 A | 8/1994 | Udipi |
| 5,491,187 A | 2/1996 | Ward et al. |
| 5,591,382 A | 1/1997 | Nahass et al. |
| 5,639,807 A | 6/1997 | Secrist et al. |
| 5,641,572 A | 6/1997 | Yoshimura et al. |
| 5,651,922 A | 7/1997 | Nohass et al. |
| 5,820,788 A | 10/1998 | Smith |
| 5,863,466 A | 1/1999 | Mor |
| 5,879,589 A | 3/1999 | Miyanaga et al. |
| 5,955,517 A | 9/1999 | Hilti et al. |
| 5,958,303 A | 9/1999 | Narkis et al. |

Primary Examiner—Mark Kopec

(57) ABSTRACT

Carbon fiber-filled, thermoplastic resin compositions having improved electrical properties at a given level of carbon fibers are formed from thermoplastic resin and carbon fibers associated into bundles with a binder. The thermoplastic resin and the binder are selected to be incompatible such that the adhesion of the fiber to the resin is poor. An exemplary composition is formed from a thermoplastic polymer selected from among polystyrene, high impact polystyrene, polycarbonate, polybutylene terephthalate, polyethylene terephthalate, polyphenylene ether, polyether imide and blends thereof; and carbon fibers associated into bundles with a polyamide terpolymer binder. The bundles are dispersed within the thermoplastic polymer. The compositions can be used for injection molding of articles for use as components in applications requiring static dissipation and/or EMI shielding. Such articles include electronic devices, dust handling equipment and notebook computer enclosures.

19 Claims, 1 Drawing Sheet

Zoltek Fiber-Filled PBT-PET-PC

—■— Polyamide —●— P29

Fortafil CA Fiber-Filled PBT-PET-PC

—■— Polyamide —●— X8

CARBON-REINFORCED THERMOPLASTIC RESIN COMPOSITION AND ARTICLES MADE FROM SAME

This is a continuation of application Ser. No. 09/497,400 filed on Feb. 3, 2000, which is incorporated herein by reference, now U.S. Pat. No. 6,248,262

FIELD OF THE INVENTION

This application relates to thermoplastic resin/carbon fiber composites which have improved properties for use in electronic components.

BACKGROUND OF THE INVENTION

Articles made from thermoplastic resins are commonly utilized in the material-handling devices, electronic devices and business equipment, for example chip carriers, and printer and copier components in contact with moving paper such as paper paths—and moving components themselves—such as ink-jet printer penholders. Electrostatic dissipation is an especially important issue within the electronic industry because of the inherently insulating nature of organic polymeric materials. Electrostatic dissipation (or discharge) is defined as a transfer of electrostatic charge between bodies at different potentials caused by direct contact or induced by an electrostatic field. As electronic devices become smaller and faster, their sensitivity to electrostatic dissipation (ESD) increases.

The US Department of Defense Handbook 263 (DOD-HDK-263) defines three categories of plastics for use in ESD protection: antistatic, static dissipating, and conductive. Characteristics of each type are listed in Table 1. Conductive fillers such as carbon fibers can be incorporated into polymeric materials to modify the electrical properties to achieve any of these three characteristics. In particular, carbon fibers facilitate dissipation of static charge and provide enhanced electromagnetic shielding. (See, for example, U.S. Pat. Nos. 4,559,164 and 5,004,561).

TABLE 1

Categories of Materials for ESD/EMI Protection

| Material Category | Material Description |
| --- | --- |
| Antistatic | Will not generate a charge. Will not allow a charge to remain localized on part surface. Refers to a material's ability to resist triboelectric charge generation. |
| Static Dissipating | Will not generate a charge. Will not allow a charge to remain localized on part surface. Can safely bleed an electric charge to ground. Surface resistivity between $10^5$ and $10^9$ Ohm/Sq. |
| Conductive | Will not generate a charge. Will not allow a charge to remain localized on part surface. Can ground a charge quickly. Will shield parts from electromagnetic fields. Surface resistivity $<10^5$ Ohm/Sq. |

SUMMARY OF THE INVENTION

The present invention provides a carbon fiber-filled, thermoplastic resin composition which has improved electrical properties at a given level of carbon fibers. The compositions of the invention comprises thermoplastic resin and carbon fibers associated into bundles with a binder. The thermoplastic resin and the binder are selected to be incompatible such that the adhesion of the fiber to the resin is poor. In an embodiment of the invention, the composition comprises:

(a) a thermoplastic polymer selected from the group consisting of polystyrene, high impact polystyrene, polycarbonate, polybutylene terephthalate, polyethylene terephthalate, polyphenylene ether, polyether imide and blends thereof; and (b) carbon fibers associated into bundles with a polyamide terpolymer binder. The bundles are dispersed within the thermoplastic polymer.

The compositions of the invention can be used for injection molding of articles for use as components in applications requiring static dissipation and/or EMI shielding. Such articles include, but are not limited to electronic devices, dust handling equipment and notebook computer enclosures.

DETAILED DESCRIPTION OF THE INVENTION

Figure 1:
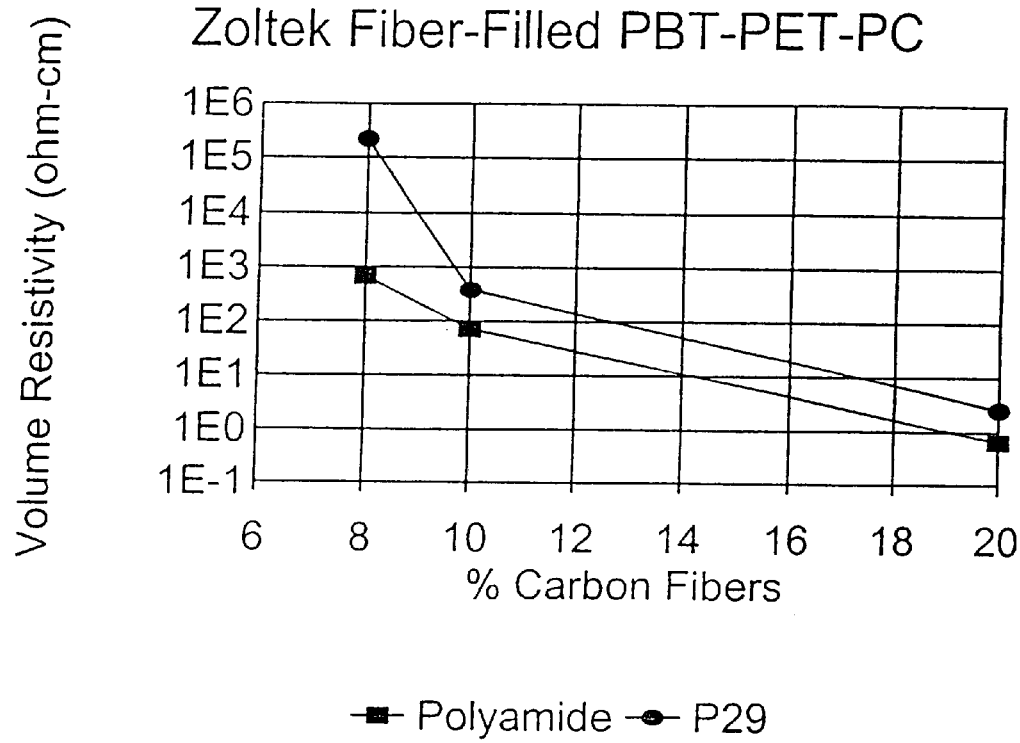
FIG. 1 shows measured volume resistivity for a composition in accordance with the invention and a comparative example.

The composition of the invention comprises a thermoplastic polymer, and carbon fibers associated into bundles with a binder. The bundles are dispersed within the thermoplastic polymer. In an embodiment of the invention, the thermoplastic polymer and the binder are selected to be incompatible with one another. The selection of a binder which is incompatible with the thermoplastic polymer resin reduces the adhesion between the fibers and the resin and improves the electrostatic dissipating properties compared to a composition made from the resin and fibers with a compatible binder.

The composition of the invention may comprise a thermoplastic polymer selected from the group consisting of polystyrene, high impact polystyrene, polycarbonate (PC), polybutylene terephthalate (PBT), polyethylene terephthalate (PET), polyphenylene ether (PPE), polyether imide (PEI) and blends thereof; and carbon fibers associated into bundles with a polyamide terpolymer binder. The bundles are dispersed within the thermoplastic polymer. Examples of carbon fibers which may be suitably employed in this composition include those sold under the following tradenames: FORTAFIL CA and FORTAFIL CM (Fortafil Fibers, Inc), ZOLTEK HT (Zoltek Corporation), TORAY (Toray Industries, Inc.), and GRAFIL (Mitsubishi).

The fibers are associated into bundles with a polyamide terpolymer binder, such as the polyamide terpolymer binder sold by DuPont under the tradename ELVAMIDE. Such binder-treated fibers can be produced by a conventional carbon fiber manufacturing process. Continuous filament carbon fibers are produced by pyrolyzing, or decomposing by heating, carbon-containing fibers such as rayon, polyacrylonitrile and petroleum pitch. The carbon fibers retain the physical shape and surface texture of the precursor fibers from which they are made. After carbonization, the fibers are surface treated. Then, the binder is applied on the fiber surface, after which the fibers are chopped to produce chopped products.

In the binder application process, continuous fiber bundles are pulled in a wet bath to coat the fibers with a desired amount of binder. The binder-coated fiber bundles, which are called a "wet forming package" are then either dried to produce a "dried forming package" or passed directly to the chopping process. The amount of binder is suitably from 0.5 to 10% by weight of the fibers.

Chopped strands can be produced by either of two major processes. In the first process, dried-forming packages are used as the source. A number of strand ends are fed into a chopper, which chops them into the correct length, for example ⅛ inch to ½ inch (0.31 to 1.27 cm) in size. The product is then screened to remove fuzz and contamination. The second process is a direct chop process in which large bushings are used in forming, and the strands are chopped in a wet state directly after the binder is applied. The wet, chopped strands are then dried and screened.

The bundles of carbon fibers are combined with the thermoplastic resin in an amount effective to achieve the desired electrical properties in a molded article produced from the mixture. For example, carbon fibers treated with polyamide terpolymer binder may be suitably utilized in amounts of from 5 to 50%, preferably 7 to 30% by weight of the thermoplastic resin. The combination of the thermoplastic resin and the carbon fibers is compounded at an elevated temperature. The specific temperature depends on the nature of the thermoplastic resin, but it will generally be in the range of 450 to 650° F. (232 to 343° C.). Compounding may be carried out in various types of equipment known in the art. In the examples set forth below, a Werner & Pfleiderer co-rotating intermeshing twin-screw extruder was utilized. This extruder has a primary (upstream) melting and mixing section which was used for initial melting of the thermoplastic resin, and a secondary (downstream) section in which carbon fibers were added and mixed to distribute them within the melted resin.

Figure 2:
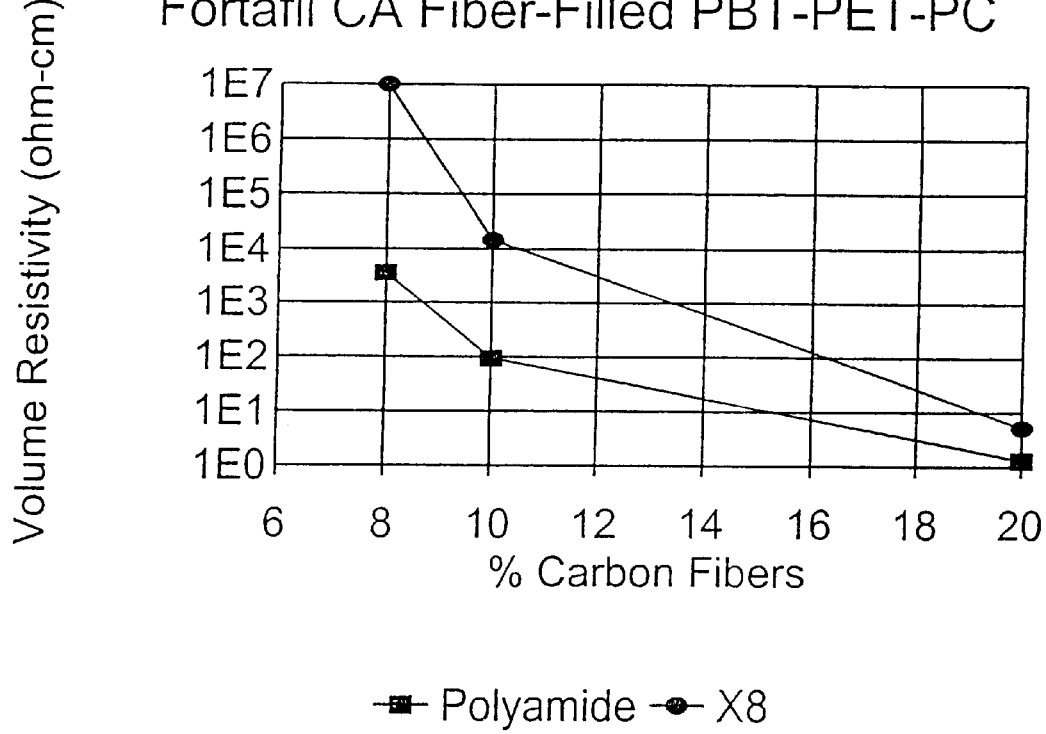
FIG. 2 shows measured volume resistivity for a composition in accordance with the invention and a comparative example.

The resulting carbon-filled thermoplastic resins have desirable ESD properties, as reflected in measurements of the volume resistivity. Volume resistivity is a measure of the leakage current directly through a material. It is defined as the electrical resistance through a one-centimeter cube of material and is expressed in ohm-cm. The lower the volume resistivity of a material, the more conductive the material is. Thus, for purposes of achieving desirable ESD properties, a lower volume resistivity is better. One procedure for measuring volume resistivity involves preparing 3 in.×6 in.× 0.125 in. plaques, by sanding the short ends of the plaques to a smooth surface and then painting them with silver paint. The sample plaque is inserted into the test fixture, and the resistance between the painted ends under a constant force is measured with a digital multimeter. The resistivity is calculated from the measured resistance and the sample geometry. FIGS. 1 and 2 show volume resistivity results for compositions in accordance with the invention in which two types of commercial fibers treated with a polyamide terpolymer binder are dispersed in a PBT-PET-PC blend. In both cases, volume resistivity results are achieved using only 8% fiber loading that are comparable to or superior to those achieved using 10% loading with the same fiber but a different binder.

Another electrical property of importance in many applications is the EMI shielding. Shielding is provided by a conductive medium that reflects, absorbs or transmits the electromagnetic radiation to the ground. Shielding effectiveness is determined by the extent to which the intensity of an electromagnetic signal is reduced by the introduction of a shielding medium. Materials are tested for attenuation or reduction of a signal, which is expressed in decibels (dB). Shielding effectiveness measured in dB is a logarithmic scale, which means that an attenuation measurement of 50 dB is ten times more effective than a measurement of 40 dB.

The ASTM has adopted two testing methods for EMI shielding: MIL-STD-285 and ASTM D-4935-89 (Table 2).

TABLE 2

Methods for Testing EMI Shielding Effectiveness

Coaxial Transmission Line Method

Data are measured in Far Field condition or a plane wave.
Test fixture: torpedo shape with maximum diameter of 21.4 in. × 5.2 in.
Test specimen: washer configuration; external diameter = 4 in. (99 mm); internal diameter = 1.7 in. (44 mm).

Shield Box (Dual Chamber) Method

Data are measured in Near Field condition.
Fixture is steel box 7.0 in. × 6.0 in. × 6.3 in.
Test specimen is 3.0 in. × 6.0 in. plaque.

As shown in Example 4 and Table 4A, good shielding effectiveness values were achieved using compositions in accordance with the invention. In contrast, compositions made with other binders, or with the polyamide terpolymer binder and polyamide as the polymer matrix had much lower shielding effectiveness values. (Table 4B). Analysis of samples prepared using fibers with different binders in the same resin system indicated that at a particular loading, there were no significant differences in the dispersion or the aspect ratio of fibers. Fracture surface analysis of the samples, however, revealed that adhesion was poor in the case of fibers with polyamide terpolymer binder for all resin systems investigated except polyamide 6,6. SEM photomicrographs showed less resin adhering to fibers in the case of polyamide terpolymer binder and the fibrillar structure of the fiber surface could be clearly seen. In general, the fiber wetting and resin-fiber adhesion was poor when polyamide terpolymer binder was used. With other binders evaluated in this study, the resin-fiber adhesion is good, which shows that the fiber surface topography is masked by resin adhering to the fibers. While not intending to be bound by any particular mechanism of action, it is believed that using binders which are incompatible with the resin matrix results in an alteration of the resin-fiber interaction.

In general, the compatibility of binders with matrix resins can be described based on the thermodynamics of polymer solutions. Solubility occurs when the free energy of mixing $$\Delta G = \Delta H - T\Delta S$$

is negative. For reasonably nonpolar molecules and in the absence of hydrogen bonding, the heat of mixing per unit volume can be approximated as $$\Delta H = v_1 v_2 (\delta_1 - \delta_2)^2$$

where $v_1$ and $v_2$ are the volume fractions of the solvent and polymer respectively. The quantity $\delta^2$ is the cohesive energy density or, for smaller molecules, the energy of vaporization per unit volume. The quantity $\delta$ is known as the solubility parameter, and can be determined for both solvent ($\delta_1$) and polymer ($\delta_2$), or for two polymers where one is considered as the solvent. As a first approximation, and in the absence of strong interactions such as hydrogen bonding, better solubility can be expected if $\delta_1 - \delta_2$ in units of $(J/cm^3)^{1/2}$ is smaller, but not if it is appreciably larger.

In the present invention, the value of $\delta$ for polyamide (NYLON 6,6) is 27.8 $(J/cm^3)^{1/2}$, while that for polyphenylene ether is 21.3 $(J/cm^3)^{1/2}$. The difference between these two numbers, 6.5 $(J/cm^3)^{1/2}$, is considered to be large enough to cause sufficient incompatibility. These materials are therefore "incompatible" as that term is used in the present invention. The same is true for PET for which has a value for δ of 21.9 $(J/cm^3)^{1/2}$. Using resins and binders which are incompatible in the composition of the invention can result in at least a 30% decrease in volume resistivity and/or a 20% increase in shielding effectiveness as compared to average values of compatible binders used with the same resin and fibers at the same loading levels. Reduction in resin-fiber adhesion reduces the resistivity and increases EMI shielding effectiveness.

In addition to carbon fibers as described above, the compositions of the invention may include additional fillers. Non-limiting examples of other fillers which may be included are glass fibers, mica, talc, is clay, silica and Wollastonite. Minor amounts of other materials can also be included to modify specific properties of the composition. For example, polytetrafluoroethylene (PTFE) in amounts of up to about 1% could be included as part of a flame retardant package. Other types of flame retardant packages including brominated flame retardant polymers (e.g., brominated PC) or phosphorus-containing organic flame retardants (such as resorcinol diphosphate, bisphenol A diphosphate or tetraxylyl piperazine diphosphamide) can also be included in effective amounts up to about 30%. PTFE could also be included in larger amounts, up to about 25%, to improve wear resistance; and polyethylene could be included in amounts up to about 2% to improve mold release characteristics. Impact modifiers such as styrene-butadiene-styrene (SBS) can be included in amounts up to about 10% to improve impact strength. Flow promoters such as hydrogenated polyterpene can also be included in amounts up to about 15%.

The compositions of the invention may be used in a method for making an injection-molded article. The method comprises the steps of:

(a) preparing a composition comprising a thermoplastic polymer selected from the group consisting of polystyrene, high impact polystyrene, polycarbonate, polybutylene terephthalate, polyethylene terephthalate, polyphenylene ether, polyether imide and blends thereof; and carbon fibers associated into bundles with a polyamide terpolymer binder, said bundles being dispersed within the thermoplastic polymer;

(b) heating the composition to melt the thermoplastic polymer; and (c) injecting the heated composition into a mold shaped to form the article.

Heating step (b) may be performed separately from any heating utilized in the preparation of the composition, for example if the composition is formed into pellets for shipment to a remote location for use. Heating step (b) may also be integral to and continuous with heating utilized in the formation of the composition itself. The temperature to which the materials are heated, and the conditions in the injection mold depend principally on the nature of the polymeric resin. Table 3 shows some exemplary conditions useful with different types of commercially available polymers.

TABLE 3

| Material | Compounding* | Molding** |
| --- | --- | --- |
| NORYL polyphenylene ether blends | 540° F., 350 rpm, 40 lb./hr | Melt Temp: 570° F., Mold Temp: 190° F. |

TABLE 3-continued

| Material | Compounding* | Molding** |
| --- | --- | --- |
| LEXAN polycarbonate | 570° F., 260 rpm, 40 lb./hr | Melt Temp: 570° F., Mold Temp: 190° F. |
| VALOX PBT-PET blend | 500° F., 350 rpm, 50 lb./hr | Melt Temp: 490° F., Mold Temp: 160° F. |
| GELON polyamide 6,6 | 540° F., 350 rpm, 40 lb./hr | Melt Temp: 580° F., Mold Temp: 170° F. |
| ULTEM polyether imide | 600° F., 400 rpm, 20 lb./hr | Melt Temp: 720° F., Mold Temp: 240° F. |
| CYCOLOY PC-ABS blends | 500° F., 300 rpm, 45 lb./hr | Melt Temp: 500° F., Mold Temp: 160° F. |

*Werner & Pfleiderer 30 mm twin screw extruder
**Van Dorn Demag 120

The compositions of the present invention are useful in manufacturing the following articles and devices: energy producing and storage devices such as batteries and fuel cells; corrosion protection applications: requiring conductivity to reduce corrosive oxidation; dissipative sheet cap layer(s) for dissipation of static electric charges; materials handling devices designed to prevent dust explosion by dissipation of static electrical charges; business or office equipment such as notebook computer enclosures, computer disk drive components such as actuator arms, printer or copier components in contact with moving paper such as paper paths, scanner baffle, and moving components in the printers such as ink-jet printer penholders; electronics: semiconductor chip trays, semiconductor wafer carriers, silicon wafer pods, head gimbal trays, CPU enclosures; cable set-top boxes requiring EMI shielding; fuel handling components such as automobile fuel tank covers; electrical charge transport applications such as grounding straps and frames and other charge dissipation devices; tunable resistors and heating devices; and antenna arrays.

The invention will now be further illustrated by way of the following non-limiting examples.

EXAMPLE 1

To prepare polyamide terpolymer treated chopped fibers, continuous carbon fiber strands were obtained from the following suppliers: ZOLTEK HT fibers from Zoltek Corporation, GRAFIL fibers from Mitsubishi and FORTAFIL CA fibers from Fortafil Fibers, Inc. Each of the continuous fibers was placed on a free-wheel reel. The strand was pulled from the reel and dipped into a bath filled with an aqueous solution of polyamide terpolymer (ELVAMIDE, 8063 DuPont) at room temperature. The wet carbon-fiber bundle was then pulled into a 8 ft long metal tubular drying section equipped with an infrared heater and air blower. The temperature inside the tube was 250° F. (121° C.). The dried carbon fiber bundle was fed into a chopper and was chopped into ⅛ inch (0.31 cm) lengths. The resultant chopped carbon fiber was coated with 6% by weight of polyamide terpolymer binder.

EXAMPLE 2

Zoltek HT carbon fibers treated with polyamide binder were combined in varying amounts with a PBT-PET-PC blend (64:22:14, by weight). The fibers and the polymer blend were compounded in a Werner & Pfleiderer co-rotating intermeshing twin screw extruder. The resin was melted in the upstream melting section at a temperature of 500° F. (260° C.) prior to introduction of the fibers. The compounded material was injection molded to form a test piece using a melt temperature of 490° F. (254° C.) and a mold temperature of 160° F. (71° C.). Test pieces were also prepared using Zoltek HT carbon fibers treated with X8 binder, an epoxy-urethane based binder sold by Zoltek Corporation as a comparative example. The test pieces were evaluated to determine the volume resistivity. As shown in FIG. 1, the volume resistivity of the product using fibers with the polyamide terpolymer binder system is consistently lower than for product using the X8 epoxy-urethane-based binder at the same fiber loading. Moreover, performance comparable to that obtained with 10% of the X8-treated fibers was obtained with only 8% loading of the polyamide terpolymer treated fibers. The results obtained for ZOLTEK HT fibers treated with polyamide terpolymer binder were also consistently superior to FORTAFIL CA fibers treated with P29 binder, an epoxy-based binder sold by Fortafil Fibers, Inc.

EXAMPLE 3

The experiment of Example 2 was repeated using Fortafil CA fibers. The resin was melted in the upstream melting section at a temperature of 500° F. (260° C.) prior to introduction of the fibers. The compounded material was injection molded to form a test piece using a melt temperature of 490° F. (254° C.) and a mold temperature of 160° F. (71° C.). The comparative example in this case was FORTAFIL CA fibers treated with P29 binder. As shown in FIG. 2, the volume resistivity of the product using fibers with the polyamide terpolymer binder system is consistently lower than for product using the P29 binder at the same fiber loading.

EXAMPLE 4

Shielding effectiveness was determined for various types of fibers treated with polyamide terpolymer binder and compounded with various polymer types. The results are summarized in Table 4A. The measured shielding effectiveness was in excess of 30 dB in every case except polycarbonate resin compounded with FORTAFIL CA fibers. However, this combination still produced a result which was far superior (24 versus 12 dB) to the control experiment. When the same experiment was carried out using other types of binders, the measured shielding effectiveness was inferior. (Table 4B) In the case of polyamide (NYLON 6,6) as the polymer component, all binders (including the polyamide terpolymer) resulted in similar value of shielding effectiveness at the same fiber loading. Thus, the superior performance of the invention is not attained in compositions where there is a high degree of compatibility between the binder and the polymer.

TABLE 4A

Results with Polyamide Terpolymer Binder

| Fiber Type | Polymer | Thickness of Test Piece (mil) | Fiber Loading (%) | Shielding Effectiveness (dB) |
|---|---|---|---|---|
| ZOLTEK HT | PC | 63 | 20 | 33.3 |
| GRAFIL | PC | 63 | 20 | 32.1 |
| ZOLTEK HT | PC | 125 | 20 | 42.5 |
| GRAFIL | PC | 125 | 20 | 34.7 |
| FORTAFIL CA | PC | 63 | 20 | 24.0 |
| ZOLTEK HT | PBT-PET-PC | 63 | 20 | 36.5 |
| ZOLTEK HT | PEI | 125 | 30 | 56.5 |

TABLE 4B

Results with Compatible Binders

| Fiber Type | Polymer | Binder | Thickness of Test Piece (mil) | Fiber Loading (%) | Shielding Effectiveness (dB) |
|---|---|---|---|---|---|
| ZOLTEK HT | PBT-PET-PC | X8 epoxy-urethane | 63 | 20 | 23.9 |
| FORTAFIL CA | PBT-PET-PC | P29 epoxy | 63 | 20 | 21.4 |
| FORTAFIL CA | PC | P29 epoxy | 63 | 20 | 12.0 |
| ZOLTEK HT | PC | X8 epoxy-urethane | 63 | 20 | 22.0 |
| ZOLTEK HT | Polyamide (NYLON 6,6) | X8 epoxy-urethane | 63 | 20 | 22.2 |
| ZOLTEK HT | Polyamide (NYLON 6,6) | ELVAMIDE polyamide terpolymer | 63 | 20 | 22.7 |
| FORTAFIL CA | Polyamide (NYLON 6,6) | P29 epoxy | 63 | 20 | 22.9 |
| FORTAFIL CA | Polyamide (NYLON 6,6) | ELVAMIDE polyamide terpolymer | 63 | 20 | 22.2 |

EXAMPLE 5

Zoltek HT and Fortafil CA fibers treated with polyamide terpolymer binder or a comparative binder were incorporated into PBT:PET:PC blends (64:22:14, by weight) using the procedure of Example 1. The resin was melted in the upstream melting section at a temperature of 500° F. (260° C.) prior to introduction of the fibers. The compounded material was injection molded to form a test piece using a melt temperature of 490° F. (254° C.) and a mold temperature of 160° F. (71° C.). The results are summarized in Table 5. As shown, the measured volume resistivity is consistently lower for the compositions of the invention, while the shielding effectiveness is higher.

TABLE 5

| Fiber Type | Binder | Volume Resistivity (Ohm-cm) 8% loading | 10% loading | 20% loading | Shielding effectiveness (dB) 20% fiber loading 63 mil thickness |
|---|---|---|---|---|---|
| FORTAFIL CA | ELVAMIDE polyamide terpolymer | 3.6E+03 | 9.5E+01 | 1.3 | 30.4 |
| FORTAFIL CA | P29 epoxy | 1.0E+07 | 1.5E+04 | 5.2 | 23.9 |
| ZOLTEK HT | ELVAMIDE polyamide terpolymer | 6.7E+02 | 7.3E+01 | 0.65 | 36.5 |
| ZOLTEK HT | X8 epoxy-urethane | 2.2E+05 | 3.8E+02 | 2.6 | 21.4 |

EXAMPLE 6

Zoltek HT and Fortafil CA fibers treated with polyamide terpolymer binder or a comparative binder were incorporated into polyether imide using the procedure of Example 1. The resin was melted in the upstream melting section at a temperature of 600° F. (315° C.) prior to introduction of the fibers. The compounded material was injection molded to form a test piece using a melt temperature of 720° F. (382° C.) and a mold temperature of 240° F. (115° C.). The results are summarized in Table 6. As shown, the measured volume resistivity is consistently lower for the compositions of the invention, while the shielding effectiveness is higher.

TABLE 6

| Fiber Type | Binder | Volume Resistivity (Ohm-cm) - 30% loading | Shielding effectiveness (dB) 20% fiber loading 125 mil thickness |
|---|---|---|---|
| FORTAFIL CA | ELVAMIDE polyamide terpolymer | 1.3E+00 | 39.5 |
| FORTAFIL CA | P29 epoxy | 4.5E+00 | 25.2 |
| ZOLTEK HT | ELVAMIDE polyamide terpolymer | 2.0E−01 | 56.5 |
| ZOLTEK HT | X8 epoxy-urethane | 2.1E+00 | 33.3 |

What is claimed is:

1. A composition comprising:
   (a) a thermoplastic polymer selected from the group consisting of polystyrene, high impact polystyrene, polycarbonate, polybutylene terephthalate, polyethylene terephthalate, polyphenylene ether, polyether imide and blends thereof; and
   (b) carbon fibers associated into bundles with a binder, said bundles being dispersed within the thermoplastic polymer, wherein the binder is a polyamide terpolymer wherein said composition has a surface resistivity below $10^5$ Ohm/Sq.

2. The composition of claim 1, wherein the carbon fibers are present in an amount of from 5 to 50% by weight of the composition.

3. The composition of claim 2, wherein the binder is present in an amount of from 0.5 to 10% by weight of the carbon fibers.

4. A method for making an injection-molded article comprising the steps of:
   (a) preparing a composition comprising a thermoplastic polymer selected from the group consisting of polystyrene, high impact polystyrene, polycarbonate, polybutylene terephthalate, polyphenylene ether, polyether imide and blends thereof; and carbon fibers associated into bundles with a polyamide terpolymer binder, said bundles being dispersed within the thermoplastic polymer;
   (b) heating the composition to melt the thermoplastic polymer; and
   (c) injecting the heated composition into a mold shaped to form the article wherein said injection-molded article has a surface resistivity below $10^5$ Ohm/Sq.

5. The method of claim 4, wherein the carbon fibers are present in an amount of from 5 to 50% by weight of the composition.

6. The method of claim 5, wherein the binder is present in an amount of from 0.5 to 10% by weight of the carbon fibers.

7. An injection-molded article prepared by a method comprising the steps of:
   (a) preparing a composition comprising a thermoplastic polymer selected from the group consisting of polystyrene, high impact polystyrene, polycarbonate, polybutylene terephthalate, polyphenylene ether, polyether imide and blends thereof; and carbon fibers associated into bundles with a polyamide terpolymer binder, said bundles being dispersed within the thermoplastic polymer;
   (b) heating the composition to melt the thermoplastic polymer; and
   (c) injecting the heated composition into a mold shaped to form the article wherein said injection-molded article has a surface resistivity below $10^5$ Ohm/Sq.

8. The article of claim 7, wherein the carbon fibers are present in an amount of from 5 to 50% by weight of the composition.

9. The article of claim 8, wherein the binder is present in an amount of from 0.5 to 10% by weight of the carbon fibers.

10. A composition comprising:
    (a) a thermoplastic polymer, and
    (b) a carbon component consisting of carbon fibers associated into bundles with a binder, said bundles being dispersed within the thermoplastic polymer, wherein the thermoplastic polymer and the binder are selected to be incompatible with one another, thereby reducing the adhesion between the fibers and the resin and improving the electrostatic dissipating properties compared to a composition made from the resin and fibers with a compatible binder wherein said composition has a surface resistivity below $10^5$ Ohm/Sq.

11. The composition of claim 10, wherein the carbon fibers are present in an amount of from 5 to 50% by weight of the composition.

12. The composition of claim 11, wherein the binder is present in an amount of from 0.5 to 10% by weight of the carbon fibers.

13. The composition of claim 10, wherein the thermoplastic polymer is selected from the group consisting of polystyrene, high impact polystyrene, polycarbonate, polybutylene terephthalate, polyethylene terephthalate, polyphenylene ether, polyether imide and blends thereof.

14. The composition of claim 13, wherein the carbon fibers are present in an amount of from 5 to 50% by weight of the composition.

15. The composition of claim 14, wherein the binder is present in an amount of from 0.5 to 10% by weight of the carbon fibers.

16. The composition of claim 10, wherein the binder is a polyamide terpolymer binder.

17. The composition of claim 16, wherein the binder is present in an amount of from 0.5 to 10% by weight of the carbon fibers.

18. The composition of claim 16, wherein the thermoplastic polymer is selected from the group consisting of polystyrene, high impact polystyrene, polycarbonate, polybutylene terephthalate, polyethylene terephthalate, polyphenylene ether, polyether imide and blends thereof.

19. The composition of claim 16, wherein the carbon fibers are present in an amount of from 5 to 50% by weight of the composition.

* * * * *